United States Patent [19]
Acker et al.

[11] Patent Number: 6,088,637
[45] Date of Patent: Jul. 11, 2000

[54] METHOD OF INFLUENCING THE ROLL BEHAVIOR OF MOTOR VEHICLES

[75] Inventors: Bernd Acker, Esslingen; Wolfgang Krause, Nufringen; Gerhard Meier, Wernau; Martin Spieth, Altbach; Thomas Szell, Waiblingen, all of Germany

[73] Assignee: Daimlerchrysler AG, Stuttgart, Germany

[21] Appl. No.: 09/374,583

[22] Filed: Aug. 13, 1999

[30] Foreign Application Priority Data

Aug. 13, 1998 [DE] Germany ............................ 198 36 674

[51] Int. Cl.[7] .......................... G06F 17/00; B60G 17/005
[52] U.S. Cl. ...................... 701/38; 280/5.502; 280/5.506; 280/5.507; 280/124.106
[58] Field of Search .................................. 701/38, 41, 91, 701/93; 280/5.502, 5.506, 5.507, 5.573, 124.106

[56] References Cited

U.S. PATENT DOCUMENTS

| 3,625,539 | 12/1971 | Crouch et al. | 280/6 |
| 4,564,214 | 1/1986 | Tokunaga et al. | 280/707 |
| 5,106,120 | 4/1992 | Di Maria | 280/689 |

*Primary Examiner*—William A. Cuchlinski, Jr.
*Assistant Examiner*—Yonel Beaulieu
*Attorney, Agent, or Firm*—Kenyon & Kenyon

[57] ABSTRACT

A method for influencing the roll response of motor vehicles having at least three wheels, the method using transverse forces acting on the center of gravity to reduce vehicle body motion. A two-part stabilizer for a vehicle axle, in which a hydraulic actuator is integrated, and which can twist the two stabilizer halves with respect to one another, is used. The moment introduced into the stabilizer is transferred to the respective knuckles via the stabilizer leg. A roll moment resulting from the transverse force acting on the vehicle is compensated by this moment. Roll behavior with respect to accuracy and speed of response is improved.

6 Claims, 1 Drawing Sheet

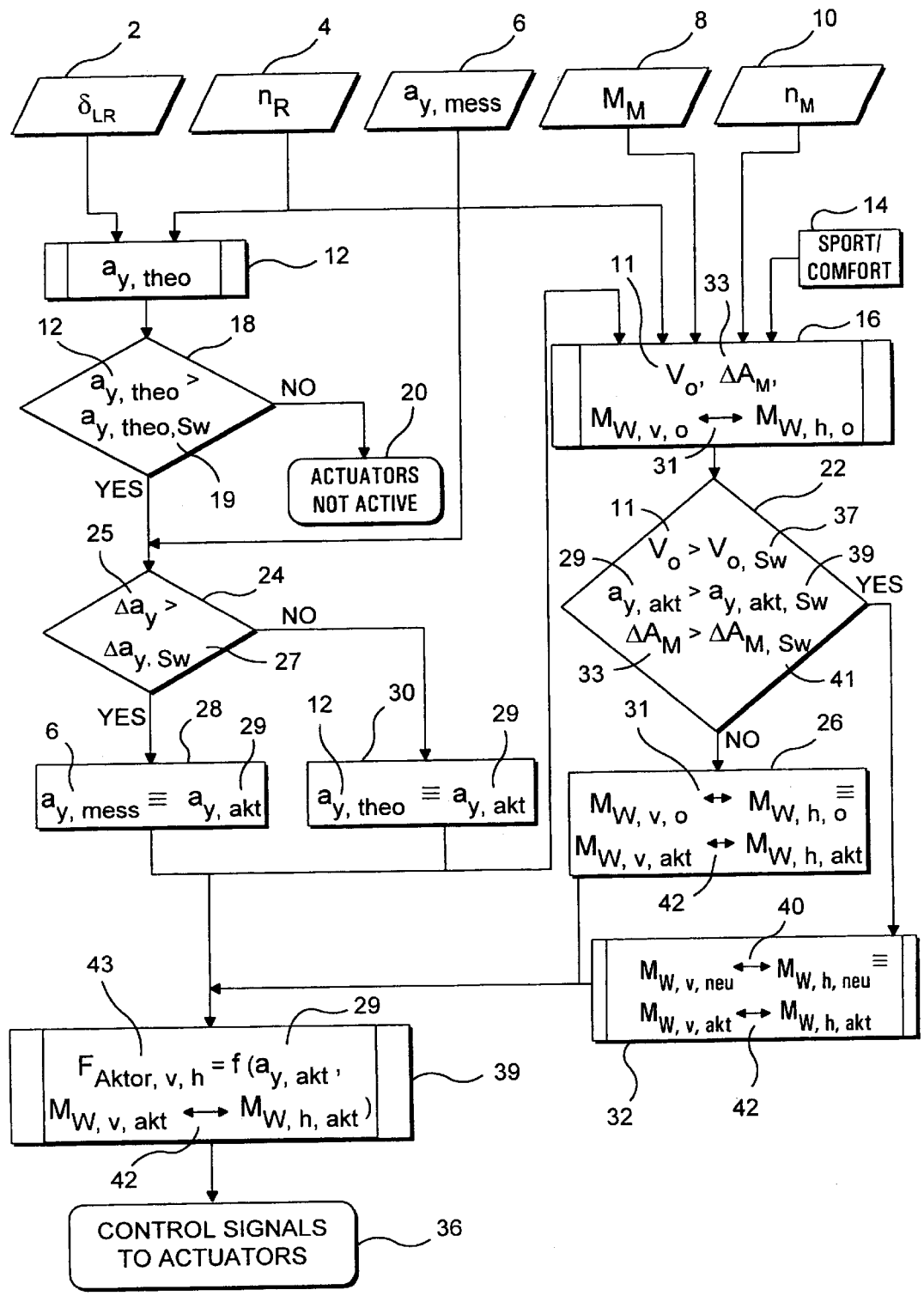

6,088,637

METHOD OF INFLUENCING THE ROLL BEHAVIOR OF MOTOR VEHICLES

FIELD OF THE INVENTION

The invention relates to a method of influencing the roll behavior of motor vehicles having at least three wheels.

RELATED TECHNOLOGY

In one method of influencing roll behavior of motor vehicles, an axle with at least one actuator is arranged between the stabilizers acting upon the wheels and the vehicle body or between the stabilizer sections of two wheels of one axle. The steering wheel angle, travel speed, and transverse vehicle acceleration are measured on the vehicle, and at least the engine speed is measured on the drive engine. The theoretical transverse vehicle acceleration is calculated from the steering wheel angle and the travel speed. The roll moment distribution between the vehicle axles is calculated from the measured or calculated transverse acceleration, engine speed and a quantity that is proportional to the gas pedal position. The actuator forces are determined from the transverse acceleration and roll moment distribution. The power supply to the actuators is controlled on the basis of the respective actuator force data.

Such a method of influencing the roll behavior of motor vehicles is described in the lecture "Aktive Roll-Stabilisation—eine kostengünstige Lösung zur aktiven Fahrwerksregelung" (Active roll stabilization—a cost-effective active chassis control method) delivered in Haus der Technik e.V., Essen, 1993, event number T306330563, where an active chassis system for improving transverse vehicle dynamics is described. The method concerns reduction of the vehicle body motion under the effect of a transverse force acting on the center of gravity. It requires that a two-part stabilizer for each vehicle axle be mounted on the vehicle. A hydraulic actuator capable of twisting the two stabilizer halves with respect to one another is arranged in the partition joint of the stabilizer. The torque introduced in the stabilizer is transmitted via the stabilizer leg to the respective steering knuckle. The reaction forces are supported by the vehicle body, which results in a moment about the roll axis acting on the vehicle body. A roll moment resulting from the transverse force acting on the vehicle can be compensated with this moment.

In order to control the actuators, the steering wheel angle and the travel speed are measured, from which the transverse acceleration acting on the vehicle can be calculated. The transverse acceleration can also be measured directly. The rotation speed and the throttle angle of the internal combustion engine powering the vehicle are also measured. The change in traction force and the roll moment distribution are calculated from these measured quantities, for example. The transverse acceleration and the roll moment distribution determine the forces exerted by the actuators on the different vehicle axles.

SUMMARY OF THE INVENTION

An object of the present invention is therefore to provide a method of influencing roll behavior with improved accuracy and speed of response, making it more flexible at the same time.

The present invention provides a method of influencing the roll response in motor vehicles having at least three wheels, in which at least one actuator is arranged between the stabilizers acting on the wheels and the vehicle body or between the stabilizer sections of two wheels of an axle;

the steering wheel angle, the travel velocity, and the vehicle transverse acceleration are measured on the vehicle, and at least the engine rpm is measured on the drive engine;

the theoretical vehicle transverse acceleration is calculated from the steering wheel angle and the travel velocity;

a roll moment distribution is calculated from the measured or calculated transverse acceleration, engine rpm, and a quantity that is proportional to the gas pedal position;

the actuator forces are determined from the transverse acceleration and roll moment distribution data; and the power supply to the actuators is controlled on the basis of the respective actuator force data, characterized in that the wheel rpm's are measured on at least two wheels of one axle, and the travel velocity necessary for calculating the transverse acceleration is calculated from the wheel rpm's;

the engine torque is measured on the drive engine or determined from the engine-specific measured data and/or characteristic maps;

the theoretical transverse acceleration is compared to a threshold value with the actuators being inactive until the threshold value is attained, while the difference between the theoretical and measured transverse acceleration is determined if the threshold is exceeded;

the difference is compared to a difference threshold value, the calculated transverse acceleration being used until the threshold is reached, while the measured transverse acceleration is defined as the actual transverse acceleration if the difference threshold is exceeded;

a roll moment distribution is determined as a function of the rpm's of the vehicle wheels or the wheel pairs of individual axles, the actual transverse acceleration or the change in the drive torque for a given regular vehicle condition;

the rpm's of the axles or wheels, the actual transverse acceleration and the change in drive torque are compared with the respective threshold values, the roll moment distribution initially calculated being used as actual roll moment distribution until the thresholds are attained, while a new actual roll moment distribution is calculated if at least two of those threshold values are exceeded, and the actuating forces of the actuators are calculated as a function of the actual transverse acceleration and the actual roll moment distribution.

In the method according to the present invention, the wheel rpm is measured on at least two wheels of an axle, and the travel speed required for calculating the transverse acceleration is determined from the wheel rpm. The engine torque is measured on the engine or derived from engine-specific measured quantities and/or characteristics. The theoretical transverse acceleration is compared to a threshold value; the actuators are not activated until the threshold value is reached, whereas the difference between the theoretical and measured transverse acceleration is determined when the threshold is exceeded. Subsequently, the difference is compared to a difference threshold value, with the calculated transverse acceleration continuing to be used as the actual acceleration until the threshold value is reached, whereas the measured transverse acceleration is defined as the actual transverse acceleration when the difference threshold value is exceeded. Furthermore, a theoretical roll moment distribution is determined as a function of the vehicle wheel rpms or the mean rpm of the wheel pairs of individual axles, the actual transverse acceleration, and the change in the drive torque for a predefined, regular travel state range. The rpms of the wheels or the axles, the actual transverse acceleration, and the change in the drive torque are compared with the respective threshold values, with the theoretical roll moment being used as the actual roll moment until the threshold values are attained, whereas a new actual roll moment distribution is calculated if at least two of the above-named threshold values are exceeded. Finally, the actuating forces of the actuators are calculated as a function of the actual transverse acceleration and the actual roll moment distribution, and converted into signals for triggering the actuators, and the actuators are powered to generate the corresponding forces that have been determined.

Rolling during cornering is largely avoided with the method according to the present invention. Using a variable roll moment distribution, for example, between a front and a rear axle, the method allows the driving response to be positively influenced. For this purpose, the front and rear axle stabilizers are prestressed using appropriate actuators. The hydraulic motors known from German Patent No. 196 47 300.4, for example, can be used as actuators. As an alternative, pneumatic or electromechanical actuators can also be used.

An actuator can be arranged between the two halves of a U-shaped stabilizer. If the actuator is an oscillating motor, for example, then the right stabilizer half is flanged onto the stator, while the left half is a part of the rotor. Both halves can be hydraulically rotated and locked with respect to one another. The stabilizer halves can be largely decoupled.

The actuators can also be arranged between each stabilizer half and the vehicle body, so that the coupling of the stabilizer halves is emulated hydraulically, pneumatically or electromechanically.

In cornering, a force and a moment that are at least approximately proportional to the transverse acceleration and which counteract a rolling motion of the vehicle body are generated for each axle, so that the vehicle rolls only slightly. To do so, a roll moment distribution is calculated from a plurality of measured quantities and their evaluation. Only some of the measured quantities are evaluated and compared to threshold values or checked for plausibility in order to replace noisy measured quantities, for example, with comparable variables based on other measured quantities.

Roll moment distribution can also be influenced via a switch, which may be manually actuated by the driver, for example, and impart at least two different driving characteristics at least by range. These switches may allow selection between a relaxed and a sporty driving characteristic. In a sporty setting, the vehicle responds in a more agile manner. It has a drive characteristic with tendency toward oversteering. In contrast, in a relaxed setting, the vehicle rather has an understeering response.

BRIEF DESCRIPTION OF THE DRAWINGS

Other details of the present invention are described in the following based on an exemplary embodiment shown in the drawing, which presents a flow chart. The symbols are explained in a symbol list that the description below.

DETAILED DESCRIPTION

The FIGURE shows the flow chart. In order to determine the calculated transverse acceleration 12, the steering wheel angle 2, the vehicle wheel rpms, or rotational velocity, 4 and the transverse acceleration 6 are measured directly or indirectly.

The steering wheel angle 2, together with the steering gear ratio, yields the direction of travel and the radius of the curve section being traveled. Instead of the steering wheel angle 2, the vehicle wheel angles (not shown) of all steered wheels can also be measured, in particular in the case of all-wheel steering.

The travel velocity that is needed for calculating the transverse acceleration is normally obtained, for example, from the mean travel velocity of the non-driven vehicle axles.

Calculated transverse acceleration 12 precedes and is less noisy than measured transverse acceleration 6. Therefore it is better suited for controlling the system.

The calculated transverse acceleration 12 is continuously compared to a threshold value 19, which divides all travel along a curved path, including theoretical straight-line travel, into travel with or without roll compensation. See block 18. Below the threshold value 19, for example, in straight-line travel, the system is deactivated. The actuators are inactive.

If the threshold value 19 is exceeded, the difference 25 between the calculated or theoretical transverse acceleration 12 and the measured transverse acceleration 6 is calculated and compared to a difference threshold value 27. See block 24. Both values are low pass filtered prior to the comparison. If the difference is greater than the difference threshold value, a smooth switch-over is performed to the measured transverse acceleration. See block 28. The latter is then used as the actual transverse acceleration 29 for the subsequent computations. This has the advantage that in the event of extraordinary travel conditions, such as vehicle skidding, erroneous interpretations of the calculated transverse acceleration are avoided. A false transverse acceleration value would result here from the driver's instinctive counter-steering reaction.

Using the engine torque 8, the engine rpm 10, the mean travel velocities of the axles 11, together with the selection of the relaxed/sporty switch 14 position, an initial roll moment distribution 31 is calculated. The actuators are preset in accordance with this initially calculated roll moment distribution. At the same time, the change in drive torque 33 is determined as a function of the mean travel velocity of the drive axle, the engine torque 8, and the engine rpm 10.

The travel velocity 11, the change in drive torque 33, and the actual transverse acceleration 29 are continuously compared with the predefined threshold values 37, 39 and 41 respectively. If, in the present embodiment, all three threshold values are exceeded, or in another embodiment, for example, at least two of the threshold values are exceeded, new roll moment distributions 40 are computed according to the magnitude of the excess over the threshold values. Otherwise, the roll moment initially calculated is preserved.

The actuator forces 43 are determined from the actual roll moment distribution 42 and the actual transverse acceleration 29. From the actuator forces, control signals 36 are generated, through which, for example, in the case of hydraulic actuators, the valves for the hydraulic motors are controlled or regulated.

In addition to the input quantities illustrated in FIG. 1, all the necessary vehicle-specific and actuator-specific data is taken into account in calculating the actuator forces.

| Symbols | |
|---|---|
| $a_{\gamma,mess}$ | transverse acceleration, measured |
| $a_{\gamma,theo}$ | transverse acceleration, computed |
| $a_{\gamma,akt}$ | transverse acceleration, actual |
| $a_{\gamma,theo,Sw}$ | threshold for theor. transverse acceleration |
| $a_{\gamma,akt,Sw}$ | threshold for actual transverse acceleration |
| $\delta_{LR}$ | steering wheel angle |
| $\Delta a_{\gamma}$ | difference between theoretical and measured transverse acceleration |
| $\Delta a_{\gamma Sw}$ | threshold for the transverse acceleration difference |
| $\Delta A_M$ | drive torque change |
| $\Delta A_{M,Sw}$ | threshold value for drive torque change |
| $F_{Aktor,v,h}$ | actuating force of the actuators on the front and rear axles |
| $M_M$ | engine torque |
| $M_{W,v}$ | roll moment, front |
| $M_{W,h}$ | roll moment, rear |
| $M_{W,v,0} \leftrightarrow M_{W,h,0}$ | roll moment distribution, initially calculated |
| $M_{W,v,neu} \leftrightarrow M_{W,h,neu}$ | roll moment distribution, new |
| $M_{W,v,akt} \leftrightarrow M_{W,h,akt}$ | roll moment distribution, actual |
| $n_M$ | engine rpm |
| $n_R$ | vehicle wheel rpm's |
| $v_0$ | vehicle velocity |

What is claimed is:

1. A method of influencing the roll response in a motor vehicle, the motor vehicle including at least three wheels, the at least three wheels including a first wheel and a second wheel, a vehicle body, a first stabilizer part acting on the first wheel, a second stabilizer part acting on the second wheel, and at least one actuator disposed between the first and second stabilizer parts or between the first and second stabilizer parts and the vehicle body, the method comprising:

measuring an angle of a steering wheel of the vehicle and a transverse acceleration of the vehicle;

measuring a respective wheel rotational velocity on at least two wheels of the at least three wheels;

measuring at least an engine rpm of the vehicle on a drive drain of the vehicle;

calculating, using the measured wheel rotational velocities, a travel velocity of the vehicle for calculating a theoretical transverse acceleration of the vehicle;

calculating the theoretical vehicle transverse acceleration from the measured steering wheel angle and the calculated travel velocity of the vehicle;

measuring the engine torque on an engine of the vehicle or determining the engine torque from engine-specific measured data and/or characteristic maps;

comparing the calculated theoretical transverse acceleration of the vehicle to a first threshold value, the first and second actuator parts being inactive when the calculated theoretical transverse acceleration of the vehicle is below the first threshold value, a difference between the calculated theoretical and the measured transverse acceleration of the vehicle being determined and compared to a second threshold value if the calculated theoretical transverse acceleration of the vehicle exceeds the first threshold value;

determining an actual transverse acceleration value, the actual transverse acceleration value being equal to the calculated theoretical transverse acceleration of the vehicle when the difference between the calculated theoretical and the measured transverse acceleration of the vehicle is less than the second threshold value, otherwise the actual transverse acceleration value being equal to the measured transverse acceleration;

determining an initial roll moment distribution from at least one of the actual transverse acceleration, the measured wheel rotational velocities and a change in the measured or determined engine torque;

comparing the actual transverse acceleration to a third threshold value, the measured wheel rotational velocities to a fourth threshold value and the change in measured or determined engine torque to a fifth threshold value;

determining an actual roll moment distribution, the actual roll moment distribution being equal to the initial roll moment distribution when less than two of the actual transverse acceleration, the measured wheel rotational velocities and the change in the measured or determined engine torque exceed the respective third, fourth or fifth threshold value, the actual roll moment distribution being equal to a new roll moment distribution determined from at least one of the actual transverse acceleration, the measured wheel rotational velocities and a change in the measured or determined engine torque when more than one of the actual transverse acceleration, the measured wheel rotational velocities and a change in the measured or determined engine torque exceed the respective third, fourth, or fifth threshold value; and calculating actuating forces of the first and second actuator parts based on the actual transverse acceleration value and the actual roll moment distribution.

2. The method as recited in claim 1 wherein the at least one actuator is disposed between the first and second stabilizer parts and the first and second wheels are associated with one axle of the motor vehicle.

3. The method as recited in claim 1 wherein the measuring of the respective wheel rotational velocity is performed at least on two wheels associated with one axle of the motor vehicle.

4. The method as recited in claim 1 further comprising controlling a power supply to the first and second actuators based on the respective actuator force data.

5. The method as recited in claim 1 wherein the determining of the initial and the new roll moment distributions is performed based on a position of a manually actuatable switch selectable between relaxed and sporty driving styles.

6. The method as recited in claim 1 wherein the first and second actuator parts include a hydraulic motor.

* * * * *